United States Patent
Miller

(10) Patent No.: US 6,832,119 B2
(45) Date of Patent: Dec. 14, 2004

(54) METHODS AND SYSTEMS FOR TORQUE RIPPLE COMPENSATION

(75) Inventor: Daniel Halvard Miller, Waynesboro, VA (US)

(73) Assignee: GE FANUC Automation North America, Inc., Charlottesville, VA (US)

(*) Notice: Subject to any disclaimer, the term of this patent is extended or adjusted under 35 U.S.C. 154(b) by 301 days.

(21) Appl. No.: 09/957,309

(22) Filed: Sep. 20, 2001

(65) Prior Publication Data

US 2003/0060902 A1 Mar. 27, 2003

(51) Int. Cl.$^7$ ............................................. G05B 13/02
(52) U.S. Cl. ........................... 700/45; 700/28; 700/32; 700/37; 700/39; 700/170; 700/280; 318/45; 318/46; 318/432
(58) Field of Search .................. 700/27, 28, 32, 700/37, 39, 45, 46, 170; 318/274–280, 798, 45–48, 800–801, 805–807, 812, 432

(56) References Cited

U.S. PATENT DOCUMENTS

| | | | | |
|---|---|---|---|---|
| 5,349,278 A | * | 9/1994 | Wedeen | 318/632 |
| 5,350,989 A | * | 9/1994 | Wedeen | 318/632 |
| 5,852,355 A | * | 12/1998 | Turner | 318/701 |
| 6,259,226 B1 | * | 7/2001 | Kaitani et al. | 318/798 |
| 6,342,880 B2 | * | 1/2002 | Rosenberg et al. | 345/161 |
| 6,407,524 B1 | * | 6/2002 | Endo et al. | 318/432 |
| 6,426,602 B1 | * | 7/2002 | McCann et al. | 318/432 |
| 6,525,497 B2 | * | 2/2003 | Lee et al. | 318/432 |

FOREIGN PATENT DOCUMENTS

JP 409009645 A * 1/1997 ............ H02M/7/48

OTHER PUBLICATIONS

Article entitled, Enhancement of Fixed Controllers via Adaptive–Q Disturbance Estimate Feedback, by T. T. Tay and J. B. Moore, *Robust and adaptive control techniques are blended to enhance one another in what is termed an adaptive–Q scheme.* Automerica, vol. 27, No. 1, pp. 39–53, 1991.

Article entitled, "An Adaptive Feedback Approach to Structural Vibration Suppression", by W. T. Baumann, *Department of Electrical Engineering, Virginia Polytechnic Institute and State University, Blacksburg, Virginia 24061, U.S.A.*, Journal of Sound and Vibration (1997) 205(1), 121–133.

Thesis submitted to the Faculty of the Virginia Polytechnic Institute and State University in partial fulfillment of the requirements for the degree of Master of Science in Electrical Engineering entitled "Adaptive Feedback Technique for Unmodeled Disturbance Rejection" by Daniel H. Miller, Apr., 1995.

Book entitled, "Adaptive Signal Processing", authored by Bernard Widrow and Sanuel D. Stearns, © 1985 by Prentice–Hall PTR.

Book entitled, "Adaptive Filter Theory", authored by Simon Haykin, © 2002 by Prentice–Hall, Inc.

* cited by examiner

*Primary Examiner*—Ramesh Patel
(74) *Attorney, Agent, or Firm*—Eugene Hyun, Esq.; Armstrong Teasdale LLP

(57) ABSTRACT

A method for compensating for torque ripple in pulse width modulated machines including providing damping for transient disturbances utilizing a fixed feedback controller and rejecting steady disturbances utilizing an adaptive controller.

35 Claims, 3 Drawing Sheets

METHODS AND SYSTEMS FOR TORQUE RIPPLE COMPENSATION

BACKGROUND OF THE INVENTION

This invention relates generally to control systems, and more specifically, to control systems where fluctuations in the torque produced by a motor are undesirable.

Permanent Magnet Synchronous Machines (PMSM), when driven by a pulse width modulation scheme, generate unwanted fluctuations, e.g. ripples, in the torque produced by the motor. This torque ripple is undesirable. Torque ripple is a major concern in many general motion applications. For example, one application where torque ripple is a major concern, and where removal of adverse torque ripple is beneficial, is semiconductor wafer handling machines. During manufacture, a manufacturer does not want to disturb a wafer in any fashion while moving the wafer from station to station. Currently, at least some known expensive motors are used to overcome torque ripple through a design incorporated into the motor.

The most widely used torque ripple compensation technique is the feed forward approach. A requirement of the feed forward approach is either prior knowledge of the motor construction and/or prior measurement of a torque ripple signal. The measured signal, referenced to the motor rotor, is then fed forward through the control into the motor. The signal application results in attenuation of torque ripple. Feed forward compensation is successful in a broad class of problems and is arguably a preferred approach when complete knowledge of the torque ripple signal is available. However, in certain situations either due to environmental, physical constraints or usability issues, complete knowledge of the torque ripple signal is unavailable.

BRIEF SUMMARY OF THE INVENTION

In one aspect of the invention, a method is provided for compensating for torque ripple in pulse width modulated machines. The method includes providing damping for transient disturbances utilizing a fixed feedback controller, and rejecting steady disturbances utilizing an adaptive controller.

In another aspect, a control system configured to compensate for torque ripple is provided. The control system includes a plant to be controlled, a fixed feedback controller configured to provide damping for transient disturbances, and an adaptive controller configured to reject steady disturbances.

In further aspect, a control system is provided including a fixed feedback controller configured to provide damping for transient disturbances and an adaptive controller configured to reject steady disturbances. The control system is configured to determine $Q_P$ to minimize system output where system output is defined as output=$P_{11}d+Q_PP_{12}e$. The adaptive controller is configured to adjust $Q_P$ utilizing a least means square (LMS) algorithm according to:

$$e(n)=d(n)-w^Tu(n)$$

$$\hat{w}(n+1)=\hat{w}(n)+\mu u(n)e^*(n)$$

for each time step, where:
M=number of taps
$\mu$=step-size
u(n)=M by 1 input vector
d(n)=desired response
$\hat{w}(n+1)$=estimate of weighting factors.

In yet another aspect, a control system is provided that includes a fixed feedback controller configured to provide damping for transient disturbances, and an adaptive controller configured to reject steady disturbances. The control system is configured to determine $Q_P$ to minimize system output where system output is defined as output=$P_{11}d+Q_PP_{12}e$. The adaptive controller is configured to adjust $Q_P$ utilizing a recursive least squares (RLS) algorithm according to:

$$k(n) = \frac{\lambda^{-1}P(n-1)u(n)}{1+\lambda^{-1}u^T(n)P(n-1)u(n)}$$

$$\alpha(n)=d(n)-\hat{w}^1(n-1)u(n)$$

$$\hat{w}(n)=\hat{w}(n-1)+k(n)\alpha^*(n)$$

$$P(n)=\lambda^{-1}P(n-1)-\lambda^{-1}k(n)u^T(n)P(n-1)$$

for each time step, where:
$\hat{w}(n)$=tap weight factor
k(n)=gain factor
$\alpha(n)$=priori estimation error
P(n)=correlation matrix inverse
and includes initialization values of:

$$P(0)=\delta^{-1}I$$

$$\hat{w}(0)=0$$

where $\delta$ is a positive number less than one.

DETAILED DESCRIPTION OF THE INVENTION

In one embodiment of the present invention, a hybrid control method combines traditional fixed feedback control with adaptive feedback techniques. The hybrid control provides damping for transient disturbances via a fixed controller and rejection of steady disturbances, for example torque ripple, via an adaptive controller.

The adaptive controller technique differs from other control techniques in that a measurement of an external signal coherent with the disturbance is not needed, nor is a knowledge of how the disturbance enters the system. As stability is an issue, the adaptive controller described herein is implemented to minimize stability problems. Further, an adaptive control technique for torque ripple compensation is based upon an adaptive feedback control technique called adaptive-Q disturbance estimate feedback (Adaptive-Q).

The adaptive controller technique differs from traditional feedback techniques since information concerning how the torque ripple signal enters the system is not utilized. The objective of a disturbance rejection control is to make the transfer function from disturbance input to system output have a desirable frequency response. In most cases, the controller attenuates or eliminates the disturbance.

Figure 1:
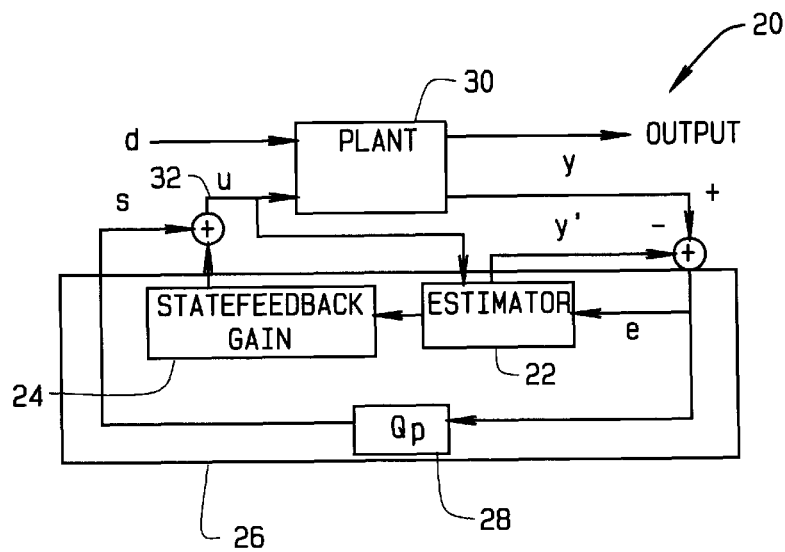
FIG. 1 is a block diagram of an adaptive Q controller.

FIG. 1 is a block diagram of an Adaptive-Q control system 20 including a fixed feedback controller, commonly referred to as a linear quadratic gaussian (LQG) controller, comprising a state estimator (Kalman filter) 22 and a state feedback gain 24. The LQG is part of an adaptive feedback structure 26, which further includes an adaptive filter ($Q_p$) 28. Feedback structure 26 is used to control a plant 30, for example, a motor. The fixed feedback controller provides a pre-determined amount of system damping for transient disturbances that adaptive filter 28 may be unable to adapt to and suppress quickly enough. Additionally, it has been shown that a fixed feedback controller increases the adaptation speed of the resulting control.

In control system 20 a control input 32 affects state estimator 22, assuming perfect system identification, in the same manner as plant 30 causing an estimation error to remain constant. Therefore, a transfer function from s to e is zero. Since the transfer function is zero any stable adaptive filter ($Q_p$) 28 placed in the loop will not drive the resulting system unstable. Additionally, by varying a $Q_p$ transfer function all controllers for stabilizing the plant are swept.

$Q_p$ 28 is adjusted to provide a desired system output. System output is defined as output=$P_{11}d+P_{12}Q_pe$. If it is assumed that y, u, e and s are scalars, then the equation is rewritten in standard output error format as:output=$P_{11}d+Q_pP_{12}e$. Restating, it is desired to determine a $Q_p$ 28 that minimizes the system output. Since $Q_p$ 28 sweeps all stabilizing controllers, a system that is guaranteed stable is obtained, assuming a perfect quality system identification.

Figure 2:
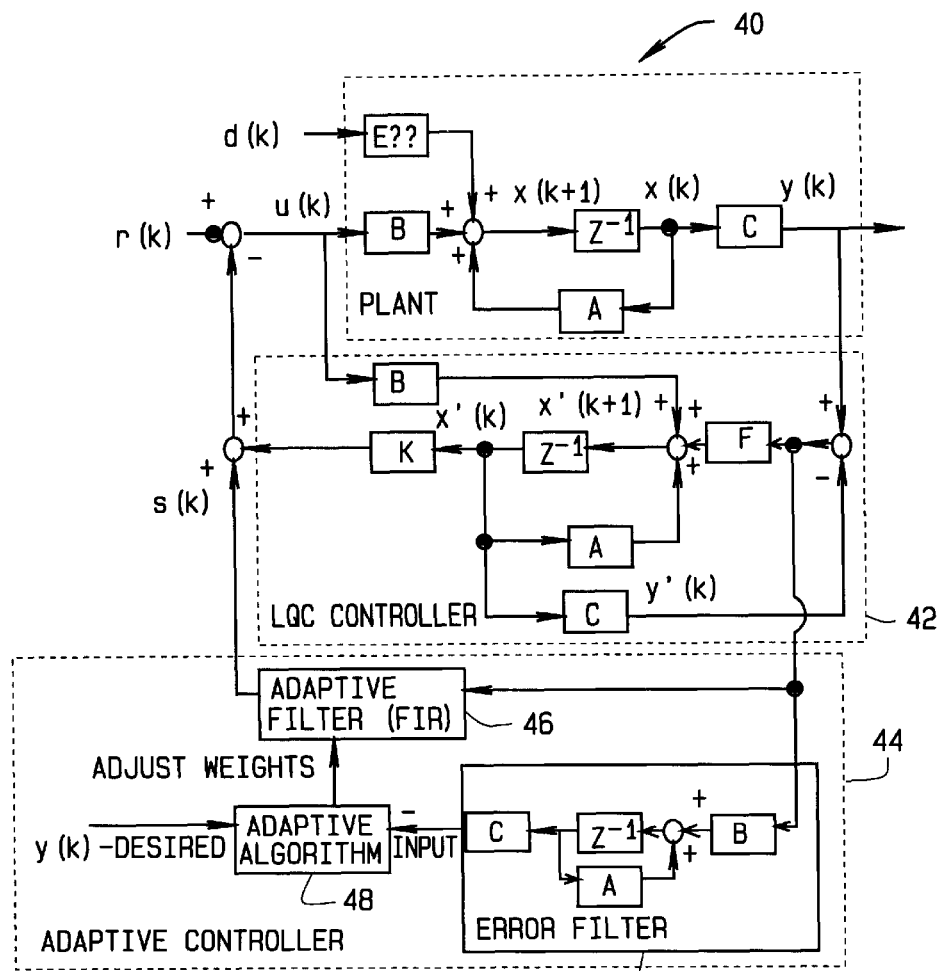
FIG. 2 is a detailed block diagram of the controller shown in FIG. 1 illustrating the adaptive Q algorithm.

FIG. 2 is a block diagram of a system 40 implementing an adaptive Q algorithm shown in more detail than the system of FIG. 1. Referring specifically to FIG. 2, a fixed feedback controller 42 is a standard linear quadratic gaussian (LQG) control. Controller 42 contains no knowledge of how a disturbance enters the system. Rather, controller 42 is configured to use an identity matrix as a model to estimate how disturbances enter the system. $Q_p$ filter structure 44 includes a finite impulse response (FIR) filter 46 and ensures a stable system transfer function. FIR filter 46 with a limited number of coefficients allows filter structure 44 to sweep a subset of the stabilizing controllers. Adaptation algorithms 48 used are gradient dissent algorithms. For example, a least mean squares (LMS) algorithm and a recursive least squares (RLS) algorithm.

Referencing the block diagram of system 40, shown in FIG. 2, a set of simulation equations implemented in system 40 is shown below. Discrete time LQG (D-T) state equations are:

$$x(k+1)=Ax(k)+Bu(k)+E??d(k)$$

$$y(k)=Cx(k)$$

$$u(k)=-Kx'(k)+r(k)+s(k)$$

$$x'(k+1)=Ax'(k)+Bu(k)+F(y(k)-y'(k))$$

$$y'(k)=Cx'(k)$$

where F and K are calculated using an appropriate Ricatti equation. An identity matrix serves as a model for the E?? matrix for the linear quadratic estimator (LQE) design. Combination of the above equations results in a single set of D-T state equations as shown below.

$$\begin{bmatrix} x(k+1) \\ x'(k+1) \end{bmatrix} = \begin{bmatrix} A & -BK \\ FC & A-BK-FC \end{bmatrix} \begin{bmatrix} x(k) \\ x'(k) \end{bmatrix} + \begin{bmatrix} B \\ B \end{bmatrix} r(k) + \begin{bmatrix} E?? \\ 0 \end{bmatrix} d(k)$$

$$\begin{bmatrix} y(k) \\ y'(k) \end{bmatrix} = \begin{bmatrix} C & 0 \\ 0 & C \end{bmatrix} \begin{bmatrix} x(k) \\ x'(k) \end{bmatrix}$$

Prior to using an estimation error signal, which is defined as e(k)=y(k)−y'(k) in the adaptation algorithm, the error signal is filtered through the transfer function $P_{12}$, shown as error filter 50 in FIG. 2. The state equations are $X_p(k+1)=Ax_p(k)+Be(k)$ and $y_p(k)=Cx(k)$, where the signals $y_p(k)$ and y(k), are desired inputs to adaptive algorithm 48 which adjusts the filter weights for FIR filter 46.

As described above, adaptive algorithm 48 is responsible for adjusting $Q_p$ filter weights (FIR filter coefficients). Two exemplary algorithms used for adjusting $Q_p$ filter weights are a least mean squares (LMS) algorithm and a recursive least squares (RLS) algorithm.

The RLS algorithm is summarized below, where

ŵ(n)=tap weight factor k(n)=gain factor

α(n)=priori estimation error

P(n)=correlation matrix inverse with initialization values of $$P(0)=\delta^{-1}I$$

$$\hat{w}(0)=0$$

providing, for each step of time, $$k(n) = \frac{\lambda^{-1}P(n-1)u(n)}{1+\lambda^{-1}u^T(n)P(n-1)u(n)}$$

$$\alpha(n)=d(n)-\hat{w}^1(n-1)u(n)$$

$$\hat{w}(n)=\hat{w}(n-1)+k(n)\alpha^*(n)$$

$$P(n)=\lambda^{-1}P(n-1)-\lambda^{-1}k(n)u^T(n)P(n-1).$$

The LMS algorithm is summarized below, where

M=number of taps

μ=step-size u(n)=M by 1 input vector d(n)=desired response

ŵ(n+1)=estimate of weighting factors providing a computation for each step of time as $$e(n)=d(n)-w^Tu(n)$$

$$\hat{w}(n+1)=\hat{w}(n)+\mu u(n)e^*(n).$$

The LMS algorithm has the advantages of being relatively simple and numerically efficient to compute. However, a disadvantage of the LMS algorithm is a fixed step size. The RLS algorithm uses a variable step size, but is numerically intensive to compute.

LQG Disturbance Rejection Simulation

A LQG disturbance rejection (LQGDR) controller differs in two ways from the LQG control structure implemented for the Adaptive-Q controller. A first difference is in a Kalman filter (LQE) estimator design. The LQGDR is an ideal control model that permits comparisons to be made to determine an effectiveness rating. The estimator design contains full knowledge of disturbance frequency content and further includes a model from disturbance input to system output. The LQE portion uses the same information concerning state and output noise as LQG design described above for Adaptive-Q control. Derivation of the LQGDR begins with augmenting the existing plant state equations to include a model of the disturbance frequency spectrum. The disturbance is modeled according to the state equations $x_d(k+1)=A_d x(k)+B_d d(k)$ and $y_d(k)=C_d x_d(k)$, where the feed through term $D_d$ is assumed to be zero.

Figure 3:
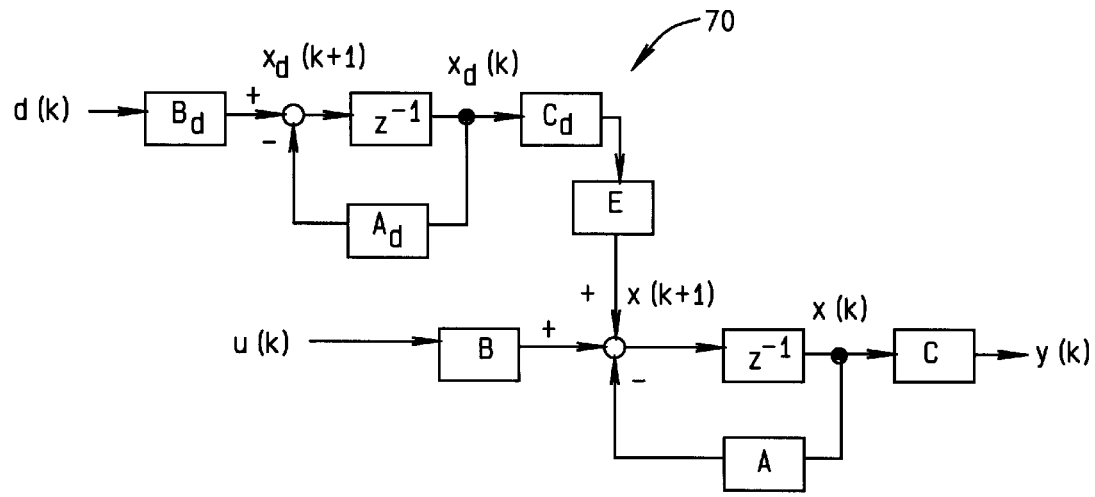
FIG. 3 is a block diagram of a plant and disturbance model.

Disturbance state equations augment plant disturbance input to create colored noise for the Kalman filter as shown in plant and disturbance model 70, shown in FIG. 3. The disturbance model in the above equation is a discrete time (D-T) model, while the disturbance is a continuous time (C-T) signal, a possible source of error. However, at a D-T system sampling rate of 1000 Hz errors are negligible.

In one embodiment, augmented plant model state equations include $$\begin{bmatrix} x(k+1) \\ x_d(k+1) \end{bmatrix} = \begin{bmatrix} A & EC_d \\ 0 & A_d \end{bmatrix} \begin{bmatrix} x(k) \\ x_d(k) \end{bmatrix} + \begin{bmatrix} B & 0 \\ 0 & B_d \end{bmatrix} \begin{bmatrix} u \\ d \end{bmatrix}$$

$$y(k) = [C\ 0] \begin{bmatrix} x(k) \\ x_d(k) \end{bmatrix}$$

where system matrices are defined as $$A_{aug} = \begin{bmatrix} A & EC_d \\ 0 & A_d \end{bmatrix} \quad B_{aug} = \begin{bmatrix} B \\ 0 \end{bmatrix}$$

$$C_{aug} = [C\ 0] \quad E_{aug} = \begin{bmatrix} 0 \\ B_d \end{bmatrix}.$$

Figure 4:
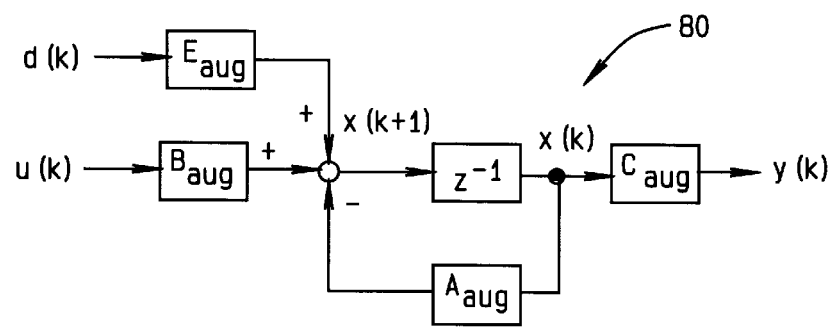
FIG. 4 is a block diagram of an augmented system.
Figure 5:
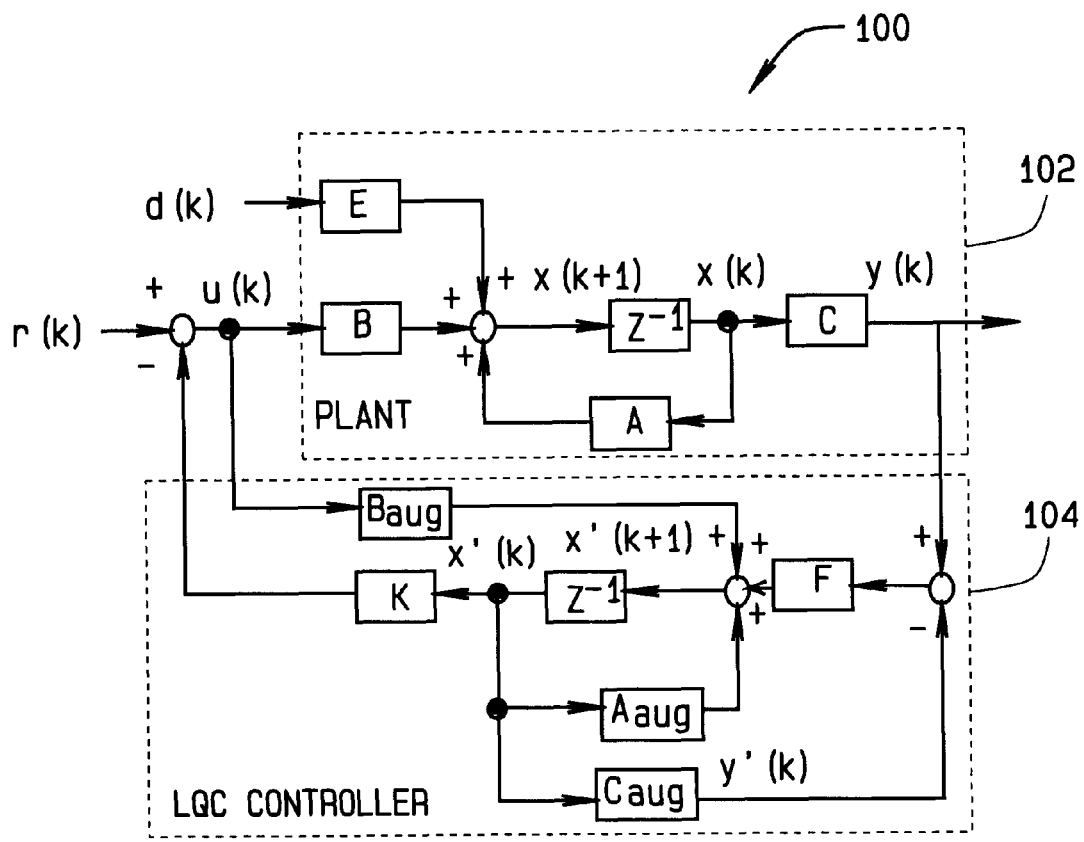
FIG. 5 is a block diagram of a motor control system incorporating an optimal disturbance rejection controller.

An augmented system model 80, shown in FIG. 4, is used to determine LQE and LQG sections. A resulting control structure including the LQGDR controller 100 is shown in FIG. 5, where a plant model 102 replaces augmented model 80, shown in FIG. 4.

The state equations for the LQGDR controller 104, therefore, are $$\begin{bmatrix} x(k+1) \\ x'(k+1) \end{bmatrix} = \begin{bmatrix} A & -BK \\ FC & A_{aug} - B_{aug}K - FC_{aug} \end{bmatrix}$$

$$\begin{bmatrix} x(k) \\ x'(k) \end{bmatrix} + \begin{bmatrix} B \\ B_{aug} \end{bmatrix} r(k) + \begin{bmatrix} E \\ 0 \end{bmatrix} d(k)$$

$$y(k) = [C\ 0] \begin{bmatrix} x(k) \\ x'(k) \end{bmatrix}.$$

While the invention has been described in terms of various specific embodiments, those skilled in the art will recognize that the invention can be practiced with modification within the spirit and scope of the claims.

What is claimed is:

1. A method for compensating for torque ripple in pulse width modulated machines, said method comprising the steps of:
providing damping for transient disturbances with which an adaptive controller is unable to adapt, wherein the damping is provided by utilizing a fixed feedback controller coupled to the adaptive controller; and
rejecting steady disturbances utilizing the adaptive controller.

2. A method according to claim 1 further comprising the step of determining $Q^p$ to minimize system output where the system output is defined as output=$P_{11}d+Q_p P_{12}e$.

3. A method according to claim 2 wherein $Q_p$ is adjusted utilizing a gradient dissent algorithm.

4. A method according to claim 3 wherein $Q_p$ is adjusted utilizing at least one of a least means square (LMS) algorithm and a recursive least squares (RLS) algorithm.

5. A method according to claim 4 wherein said step of adjusting $Q_p$ utilizing the LMS algorithm further comprises the step of computing for each time step:

$$e(n)=d(n)-w^T u(n)$$

$$\hat{w}(n+1)=\hat{w}(n)+\mu u(n)e^*(n)$$

where:

M=number of taps $\mu$=step-size u(n)=M by 1 input vector d(n)=desired response $\hat{w}(n+1)$=estimate of weighting factors.

6. A method according to claim 4 wherein said step of adjusting $Q_p$ utilizing the RLS algorithm further comprises the step of computing for each time step:

$$k(n) = \frac{\lambda^{-1} P(n-1) u(n)}{1 + \lambda^{-1} u^T(n) P(n-1) u(n)}$$

$$\alpha(n)=d(n)-\hat{w}^t(n-1)u(n)$$

$$\hat{w}(n)=\hat{w}(n-1)+k(n)\alpha^*(n)$$

$$P(n)=\lambda^{-1}P(n-1)-\lambda^{-1}k(n)u^T(n)P(n-1)$$

where:

$\hat{w}(n)$=tap weight factor k(n)=gain factor $\alpha(n)$=priori estimation error P(n)=correlation matrix inverse and includes initialization values of:

$$P(0)=\delta^{-1}I$$

$$\hat{w}(0)=0$$

where $\delta$ is a positive number less than one.

7. A method according to claim 1 where said step of providing damping for transient disturbances further comprises the step of providing damping utilizing a linear quadratic guassian (LQG) controller.

8. A method according to claim 1 wherein said step of rejecting steady disturbances further comprises the step of rejecting steady disturbances utilizing an adaptive-Q structure.

9. A method according to claim 8 further comprising the step of configuring the adaptive-Q structure according to a plurality of discrete time state equations:

$$x(k+1)=Ax(k)+Bu(k)+E??d(k)$$

$$y(k)=Cx(k)$$

$$u(k)=-Kx'(k)+r(k)+s(k)$$

$$x'(k+1)=Ax'(k)+Bu(k)+F(y(k)-y(k))$$

$$y'(k)=Cx'(k)$$

where calculations for F and K are done with an appropriate Ricatti equation.

10. A method according to claim 9 further comprising the step of combining the discrete time state equations as:

$$\begin{bmatrix} x(k+1) \\ x'(k+1) \end{bmatrix} = \begin{bmatrix} A & -BK \\ FC & A-BK-FC \end{bmatrix}\begin{bmatrix} x(k) \\ x'(k) \end{bmatrix} + \begin{bmatrix} B \\ B \end{bmatrix}r(k) + \begin{bmatrix} E?? \\ 0 \end{bmatrix}d(k)$$

$$\begin{bmatrix} y(k) \\ y'(k) \end{bmatrix} = \begin{bmatrix} C & 0 \\ 0 & C \end{bmatrix}\begin{bmatrix} x(k) \\ x'(k) \end{bmatrix}.$$

11. A method according to claim 10 further comprising the step of filtering an estimation error signal e(k) through a transfer function $P_{12}$, where the error estimation signal is defined as e(k)=y(k)−y'(k) and a plurality of state equations are:

$$x_p(k+1)=Ax_p(k)+Be(k) \text{ and}$$

$$y_p(k)=Cx(k).$$

12. A method according to claim 8 further comprising the step of rejecting the steady disturbances utilizing an optimal disturbance rejection controller.

13. A method according to claim 12 further comprising the step of utilizing the optimal disturbance rejection controller as a baseline for results comparison when the adaptive-Q structure yields non-zero results.

14. A method according to claim 12 wherein said step of utilizing an optimal disturbance rejection controller further comprises the step of modeling a disturbance using state equations:

$$x_d(k+1)=A_dx(k)+B_dd(k) \text{ and}$$

$$y_d(k)=C_dx_d(k), \text{ where } D_d \text{ is assumed to be zero.}$$

15. A method according to claim 14 wherein augmented state equations are defined as:

$$\begin{bmatrix} x(k+1) \\ x_d(k+1) \end{bmatrix} = \begin{bmatrix} A & EC_d \\ 0 & A_d \end{bmatrix}\begin{bmatrix} x(k) \\ x_d(k) \end{bmatrix} + \begin{bmatrix} B & 0 \\ 0 & B_d \end{bmatrix}\begin{bmatrix} u \\ d \end{bmatrix}$$

$$y(k) = [C\ 0]\begin{bmatrix} x(k) \\ x_d(k) \end{bmatrix}$$

and system matrices are defined as:

$$A_{aug} = \begin{bmatrix} A & EC_d \\ 0 & A_d \end{bmatrix} \quad B_{aug} = \begin{bmatrix} B \\ 0 \end{bmatrix}$$

$$C_{aug} = [C\ 0] \quad E_{aug} = \begin{bmatrix} 0 \\ B_d \end{bmatrix}.$$

16. A method according to claim 14 wherein augmented state equations for an LQGDR controller are defined as:

$$\begin{bmatrix} x(k+1) \\ x'(k+1) \end{bmatrix} = \begin{bmatrix} A & -BK \\ FC & A_{aug}-B_{aug}K-FC_{aug} \end{bmatrix}\begin{bmatrix} x(k) \\ x'(k) \end{bmatrix} +$$

$$\begin{bmatrix} B \\ B_{aug} \end{bmatrix}r(k) + \begin{bmatrix} E \\ 0 \end{bmatrix}d(k)$$

$$y(k) = [C\ 0]\begin{bmatrix} x(k) \\ x'(k) \end{bmatrix}.$$

17. A control system configured to compensate for torque ripple, said control system comprising:
   an adaptive controller configured to reject steady disturbances;
   a fixed feedback controller coupled to said adaptive controller and configured to provide damping for transient disturbances with which said adaptive controller is unable to adapt; and
   a plant to be controlled by said fixed feedback and adaptive controllers.

18. A control system according to claim 17 wherein said control system is configured to determine $Q_p$ to minimize system output where system output is defined as output= $P_{11}d+Q_pP_{12}e$.

19. A control system according to claim 18 wherein said adaptive controller is configured to adjust $Q_p$ utilizing a gradient dissent algorithm.

20. A control system according to claim 19 wherein said adaptive controller is configured to adjust $Q_p$ utilizing at least one of a least means square (LMS) algorithm and a recursive least squares (RLS) algorithm.

21. A control system according to claim 20 wherein said adaptive controller is configured adjust $Q_p$ utilizing an LMS algorithm according to:

$$e(n)=d(n)-w^Tu(n)$$

$$\hat{w}(n+1)=\hat{w}(n)+\mu u(n)e^*(n)$$

for each time step, where:
   M=number of taps
   $\mu$=step-size
   u(n)=M by 1 input vector
   d(n)=desired response
   ŵ(n+1)=estimate of weighting factors.

22. A control system according to claim 20 wherein said adaptive controller is configured adjust $Q_p$ utilizing an RLS algorithm according to:

$$k(n) = \frac{\lambda^{-1}P(n-1)u(n)}{1+\lambda^{-1}u^T(n)P(n-1)u(n)}$$

$$\alpha(n)=d(n)-\hat{w}'(n-1)u(n)$$

$$\hat{w}(n)=\hat{w}(n-1)+k(n)\alpha^*(n)$$

$$P(n)=\lambda^{-1}P(n-1)-\lambda^{-1}k(n)u^T(n)P(n-1)$$

for each time step, where:
   ŵ(n)=tap weight factor
   k(n)=gain factor
   α(n)=priori estimation error
   P(n)=correlation matrix inverse
and includes initialization values of:

$$P(0)=\delta^{-1}I$$

$$\hat{w}(0)=0$$

where δ is a positive number less than one.

23. A control system according to claim 17 configured to provide damping for transient disturbances utilizing a linear quadratic guassian (LQG) controller.

24. A control system according to claim 17 configured to reject steady disturbances utilizing an adaptive-Q structure.

25. A control system according to claim 24 wherein the adaptive Q structure is configured according to:

$$x(k+1)=Ax(k)+Bu(k)+E??d(k)$$

$$y(k)=Cx(k)$$

$$u(k)=-Kx'(k)+r(k)+s(k)$$

$$x'(k+1)=Ax'(k)+Bu(k)+F(y(k)-y(k))$$

$$y'(k)=Cx'(k)$$

where F and K are calculated with an appropriate Ricatti equation.

26. A control system according to claim 25 configured to combine discrete time state equations according to:

$$\begin{bmatrix} x(k+1) \\ x'(k+1) \end{bmatrix} = \begin{bmatrix} A & -BK \\ FC & A-BK-FC \end{bmatrix} \begin{bmatrix} x(k) \\ x'(k) \end{bmatrix} + \begin{bmatrix} B \\ B \end{bmatrix} r(k) + \begin{bmatrix} E?? \\ 0 \end{bmatrix} d(k)$$

$$\begin{bmatrix} y(k) \\ y'(k) \end{bmatrix} = \begin{bmatrix} C & 0 \\ 0 & C \end{bmatrix} \begin{bmatrix} x(k) \\ x'(k) \end{bmatrix}.$$

27. A control system according to claim 26 further configured to filter an estimation error signal e(k) through a transfer function $P_{12}$, where the error estimation signal is defined as e(k)=y(k)−y'(k) and a plurality of state equations are:

$$x_p(k+1)=Ax_p(k)+Be(k) \text{ and}$$

$$y_p(k)=Cx(k).$$

28. A control system according to claim 24 further comprising an optimal disturbance rejection controller configured to reject the steady disturbances.

29. A control system according to claim 28 wherein said optimal disturbance rejection controller is configured as a baseline for a results comparison when the adaptive-Q structure yields non-zero results.

30. A control system according to claim 28 wherein said optimal disturbance rejection controller is configured to model a disturbance using state equations:

$$x_d(k+1)=A_dx(k)+B_dd(k) \text{ and}$$

$$y_d(k)=C_dx_d(k), \text{ where } D_d \text{ is assumed to be zero.}$$

31. A control system according to claim 30 wherein said optimal disturbance rejection controller is configured to model a disturbance utilizing augmented state equations:

$$\begin{bmatrix} x(k+1) \\ x_d(k+1) \end{bmatrix} = \begin{bmatrix} A & EC_d \\ 0 & A_d \end{bmatrix} \begin{bmatrix} x(k) \\ x_d(k) \end{bmatrix} + \begin{bmatrix} B & 0 \\ 0 & B_d \end{bmatrix} \begin{bmatrix} u \\ d \end{bmatrix}$$

$$y(k) = [C \ 0] \begin{bmatrix} x(k) \\ x_d(k) \end{bmatrix}$$

and system matrices are defined as:

$$A_{aug} = \begin{bmatrix} A & EC_d \\ 0 & A_d \end{bmatrix} \quad B_{aug} = \begin{bmatrix} B \\ 0 \end{bmatrix}$$

$$C_{aug} = [C \ 0] \quad E_{aug} = \begin{bmatrix} 0 \\ B_d \end{bmatrix}.$$

32. A control system according to claim 30 wherein augmented state equations for an LQGDR controller are defined as:

$$\begin{bmatrix} x(k+1) \\ x'(k+1) \end{bmatrix} = \begin{bmatrix} A & -BK \\ FC & A_{aug}-B_{aug}K-FC_{aug} \end{bmatrix} \begin{bmatrix} x(k) \\ x'(k) \end{bmatrix} +$$

$$\begin{bmatrix} B \\ B_{aug} \end{bmatrix} r(k) + \begin{bmatrix} E \\ 0 \end{bmatrix} d(k)$$

$$y(k) = [C \ 0] \begin{bmatrix} x(k) \\ x'(k) \end{bmatrix}.$$

33. A control system comprising:

an adaptive controller configured to reject steady disturbances utilizing an adaptive-Q structure;

a fixed feedback controller coupled to said adaptive controller and configured to provide damping for transient disturbances;

said control system configured to determine $Q_p$ to minimize system output where system output is defined as output=$P_{11}d+Q_pP_{12}e$; and said adaptive controller configured to adjust $Q_p$ utilizing a least means square (LMS) algorithm according to:

$$e(n)=d(n)-w^Tu(n)$$

$$\hat{w}(n+1)=\hat{w}(n)+\mu u(n)e^*(n)$$

for each time step, where:

M=number of taps $\mu$=step-size u(n)=M by 1 input vector d(n)=desired response $\hat{w}$(n+1)=estimate of weighting factors.

34. A control system according to claim 33 wherein the adaptive-Q structure is configured according to:

$$x(k+1)=Ax(k)+Bu(k)+E??d(k)$$

$$y(k)=Cx(k)$$

$$u(k)=-Kx'(k)+r(k)+s(k)$$

$$x'(k+1)=Ax'(k)+Bu(k)+F(y(k)-y(k))$$

$$y'(k)=Cx'(k)$$

where F and K are calculated with an appropriate Ricatti equation.

35. A control system according to claim 34 configured to combine discrete time state equations according to:

$$\begin{bmatrix} x(k+1) \\ x'(k+1) \end{bmatrix} = \begin{bmatrix} A & -BK \\ FC & A-BK-FC \end{bmatrix} \begin{bmatrix} x(k) \\ x'(k) \end{bmatrix} + \begin{bmatrix} B \\ B \end{bmatrix} r(k) + \begin{bmatrix} E?? \\ 0 \end{bmatrix} d(k)$$

$$\begin{bmatrix} y(k) \\ y'(k) \end{bmatrix} = \begin{bmatrix} C & 0 \\ 0 & C \end{bmatrix} \begin{bmatrix} x(k) \\ x'(k) \end{bmatrix}.$$

\* \* \* \* \*

UNITED STATES PATENT AND TRADEMARK OFFICE
CERTIFICATE OF CORRECTION

PATENT NO. : 6,832,119 B2
APPLICATION NO. : 09/957309
DATED : December 14, 2004
INVENTOR(S) : Miller Page 1 of 1

It is certified that error appears in the above-identified patent and that said Letters Patent is hereby corrected as shown below:

Column 5,
Line 66, delete "$Q^P$" and insert -- $Q_p$ --.

Column 10,
Line 45, delete "-y(k))" and insert -- -y'(k)) --.

Signed and Sealed this

Twenty-seventh Day of June, 2006

JON W. DUDAS
*Director of the United States Patent and Trademark Office*